W. H. PRICE.
TRACTOR ATTACHMENT FOR TRUCKS.
APPLICATION FILED MAR. 4, 1918.
1,292,045.
Patented Jan. 21, 1919.
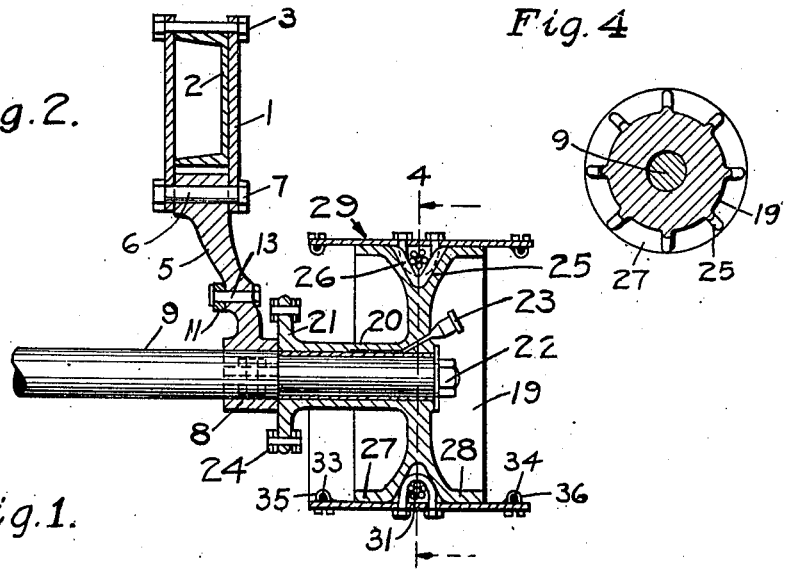
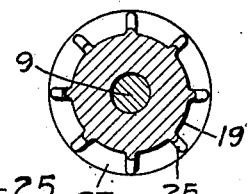
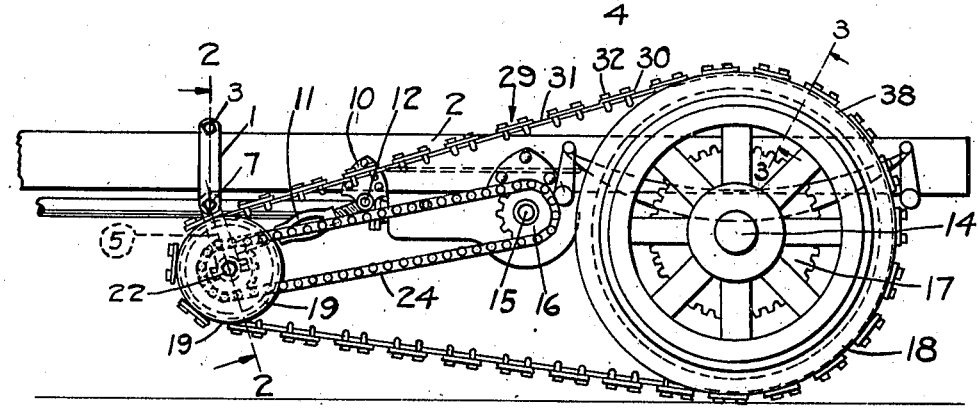
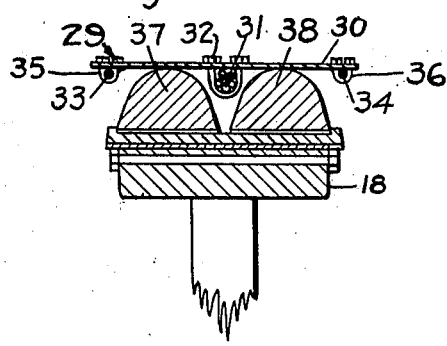
Inventor:
William H. Price,
by Hazard & Miller
Atty's.

UNITED STATES PATENT OFFICE.

WILLIAM H. PRICE, OF WILMINGTON, CALIFORNIA.

TRACTOR ATTACHMENT FOR TRUCKS.

1,292,045.  Specification of Letters Patent.  Patented Jan. 21, 1919.

Application filed March 4, 1918. Serial No. 220,337.

*To all whom it may concern:*

Be it known that I, WILLIAM H. PRICE, a citizen of the United States, residing at Wilmington, in the county of Los Angeles and State of California, have invented new and useful Improvements in Tractor Attachments for Trucks, of which the following is a specification.

My object is to make a tractor attachment for trucks so that the attachment may be applied when traveling through the desert and the like and removed when traveling on good roads, and my invention consists in the novel features herein shown, described and claimed.

Figure 1 is a fragmentary side elevation of a truck showing one drive wheel with my tractor attachment in use.

Fig. 2 is an enlarged cross-sectional detail on the line 2—2 of Fig. 1.

Fig. 3 is an enlarged fragmentary cross-sectional detail on the line 3—3 of Fig. 1.

Fig. 4 is a sectional detail on the line 4—4 of Fig. 2.

The countershaft supporting shackle 1 is secured to the main frame side bar 2 by an upper bolt 3. The swinging arm 5 has a bearing 6 in its upper end fitting between the members of the shackle 1, and a pivot bolt 7 is inserted through the members of the shackle 1 and through the bearing 6 so that the arm 5 projects downwardly and swings freely upon the bolt 7. The countershaft bearing 8 is formed integral with the lower end of the arm 5 and supports one end of the countershaft 9, the other end of the countershaft being supported in a similar manner from the opposite side bar of the frame.

The strut supporting plate 10 is secured to the side bar 2 some distance behind the shackle 1, and the turn-buckle strut 11 is connected to the plate 10 by a pivot pin 12 and to the arm 5 by a pivot pin 13, and there is a similar turn-buckle strut at the opposite side of the truck, so that by manipulating the turn-buckles of the struts 11 the countershaft 9 may be moved forwardly or backwardly relatively to the rear axle 14.

The jack-shaft 15 is of the ordinary construction and has sprocket wheels 16 upon its ends connected to the sprocket wheels 17 upon the drive wheels 18 mounted upon the axle 14 in the ordinary manner.

In applying my attachment the chains connecting the sprocket wheels 16 and 17 are removed, to be replaced when the attachment is removed.

Sprocket drums 19 are formed upon the outer ends of sleeves 20 and the sprocket wheels 21 are formed upon the inner ends of the sleeves, said sleeves being loosely mounted upon the ends of the countershaft 9 outside of the bearings 8 and held in place by nuts 22. An oil cup 23 may be provided for each sleeve. The sprocket wheels 21 are in line with the sprocket wheels 16 and are connected thereto by chains 24, said chains 24 being preferably the same chains used in connecting the sprocket wheels to the sprocket wheels 17. The sprocket drums 19 have central peripheral V-shaped grooves 25 interrupted by ribs 26 and said drums have flat annular rims 27 and 28 extending outwardly from the grooves 25.

The traction belt treads 29 are adapted to run around the drive wheels 18 and around the sprocket drums 19.

The traction belt treads each comprise rectangular flat metal plates 30, a central cable 31 adapted to run in a groove 25, U-bolt clamps 32 connecting the plates 30 to the cable 31; said plates being evenly spaced apart along the cable so that the U-bolt clamps will engage the ribs 26; and cables 33 and 34 secured to the ends of the plates by clamps 35 and 36. The plates 30 are longer than the width of the drum 19 so that the cables 33 and 34 run outside of the drum. The central cable 31 and the U-bolt clamps 32 will run between the rubber treads 37 and 38 upon the rear wheels 18 and the plates 30 will bear upon the peripheries of the rubber treads. The U-bolt clamps will engage the ribs 26 upon the drum 19 and produce a sprocket and chain connection, so that when the jack-shaft 15 is operated by the engine the drums 19 will operate to pull the traction belt treads 29 to pull the rear wheels 18 and the belt treads will support the rear wheels and assist in going over soft ground.

Various changes may be made in the details of construction without departing from the spirit of my invention as claimed.

I claim:

1. A tractor attachment for trucks, comprising a countershaft, means for mounting the countershaft adjustably parallel with a jack-shaft, sprocket wheels upon the countershaft and adapted to line up with the sprocket wheels on the jack-shaft, sprocket drums fixed to the countershaft sprocket wheels in line with the drive wheels, and traction belt treads adapted to run upon the sprocket drums and upon the drive wheels; so that the chains may be removed from the drive wheel sprockets and applied to the countershaft sprockets.

2. The combination with a truck having a jack-shaft parallel with its rear axle and sprockets and chains connecting the jack-shaft to the rear drive wheels, of a tractor attachment comprising a countershaft adjustably mounted parallel with the jack-shaft, sprocket wheels upon the countershaft in line with the sprocket wheels upon the jack-shaft; so that the chains may be moved from the drive wheel sprockets to these countershaft sprockets; sprocket drums upon the countershaft rigid with the sprocket wheels and in line with the drive wheels, and traction belt treads adapted to run upon the sprocket drums and drive the drive wheels.

3. In a tractor attachment for trucks, a traction belt tread construction comprising a sprocket drum having a V-shaped groove interrupted by ribs, a cable adapted to run in the groove and to run on the periphery of a drive wheel, and plates clamped upon the cable; so that the clamps will be engaged by the ribs to drive the belt tread.

In testimony whereof I have signed my name to this specification.

WILLIAM H. PRICE.